United States Patent
Deng et al.

(10) Patent No.: US 10,246,637 B2
(45) Date of Patent: Apr. 2, 2019

(54) ONE-POT METHOD FOR PREPARING CORE-SHELL NANOCRYSTALS

(71) Applicant: Massachusetts Institute of Technology, Cambridge, MA (US)

(72) Inventors: Zhengtao Deng, Cambridge, MA (US); Tian Ming, Cambridge, MA (US); He Dong, Winchester, MA (US); Aishuang Xiang, Ottawa, IL (US); Jing Kong, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 26 days.

(21) Appl. No.: 15/149,131

(22) Filed: May 7, 2016

(65) Prior Publication Data
US 2016/0326431 A1 Nov. 10, 2016

Related U.S. Application Data

(60) Provisional application No. 62/159,204, filed on May 8, 2015.

(51) Int. Cl.
| | |
|---|---|
| H01L 51/50 | (2006.01) |
| B82Y 30/00 | (2011.01) |
| C09K 11/88 | (2006.01) |
| B01J 13/02 | (2006.01) |
| C09B 67/02 | (2006.01) |
| B82Y 15/00 | (2011.01) |
| B82Y 40/00 | (2011.01) |

(52) U.S. Cl.
CPC ............ *C09K 11/883* (2013.01); *B01J 13/02* (2013.01); *C09B 67/0097* (2013.01); *B82Y 15/00* (2013.01); *B82Y 40/00* (2013.01); *Y10S 977/882* (2013.01)

(58) Field of Classification Search
CPC .......... B82Y 30/00; B82Y 40/00; H01L 51/50
See application file for complete search history.

(56) References Cited

U.S. PATENT DOCUMENTS

| | | | |
|---|---|---|---|
| 3,776,738 A | 12/1973 | Ohlschlager et al. | |
| 2008/0246006 A1* | 10/2008 | Ying | B82Y 10/00 252/301.36 |
| 2014/0087409 A1 | 3/2014 | Wang et al. | |

FOREIGN PATENT DOCUMENTS

| | | |
|---|---|---|
| WO | 2006/104464 A1 | 10/2006 |
| WO | 2008/086622 A1 | 7/2008 |
| WO | 2009/020436 A1 | 2/2009 |
| WO | 2013052541 A2 | 4/2013 |

OTHER PUBLICATIONS

Effect of surface ligands on the optical properties of aqueous soluble CdTe quantum dots, Silva et al. Nanoscale Research Letters 2012, 7:536.*

In situ synthesis of highly luminescent glutathione-capped CdTe/ZnS quantum dots with biocompatibility, Y.-F. Liu, J.-S. Yu / Journal of Colloid and Interface Science 351 (2010) 1-9.*

International Search Report dated Aug. 5, 2016, issued in International Application No. PCT/US2016/031392.

Written Opinion of the International Searching Authority dated Aug. 5, 2016, issued in International Application No. PCT/US2016/031392.

* cited by examiner

*Primary Examiner* — Khanh T Nguyen
*Assistant Examiner* — Haidung D Nguyen
(74) *Attorney, Agent, or Firm* — Steptoe & Johnson LLP

(57) ABSTRACT

A method for preparing a core-shell nanocrystal can include mixing an M-containing precursor solution, an X-containing precursor solution, and an acid or alcohol in an inert atmosphere at a first temperature to form a reaction mixture; maintaining the reaction mixture at the first temperature to grow the MX core of the nanocrystal; raising the temperature of the reaction mixture to a second temperature; and maintaining the reaction mixture at the second temperature to grow a shell of the nanocrystal.

27 Claims, 10 Drawing Sheets

ONE-POT METHOD FOR PREPARING CORE-SHELL NANOCRYSTALS

CLAIM OF PRIORITY

This application claims priority from U.S. Provisional Application No. 62/159,204, filed May 8, 2015, which is incorporated by reference in its entirety.

TECHNICAL FIELD

The invention features methods of manufacturing nanocrystals.

BACKGROUND

Semiconductor nanocrystals (semiconductor nanocrystals) whose radii are smaller than the bulk exciton Bohr radius constitute a class of materials intermediate between molecular and bulk forms of matter. Quantum confinement of both the electron and hole in all three dimensions leads to an increase in the effective band gap of the material with decreasing crystallite size. A nanocrystal can have a core and a shell.

SUMMARY

In one aspect, a method for preparing a core-shell nanocrystal can include mixing an M-containing precursor solution, an X-containing precursor solution, and an acid or alcohol in an inert atmosphere at a first temperature to form a reaction mixture; maintaining the reaction mixture at the first temperature to grow the MX core of the nanocrystal; raising the temperature of the reaction mixture to a second temperature; and maintaining the reaction mixture at the second temperature to grow a shell of the nanocrystal.

In certain embodiments, the M-containing precursor solution can include zinc, cadmium, or mercury. In certain embodiments, the first temperature can be between 40° C. and 140° C. In certain embodiments, the X-containing precursor solution can include sulfur, selenium, or tellurium.

In certain embodiments, the acid can include a thioglycolic acid. In certain embodiments, the acid or alcohol can include a mercaptopropionic acid or alcohol.

In certain embodiments, the nanocrystal can be polyhedral.

In certain embodiments, the acid or alcohol can include a thiol group. In certain embodiments, the acid or alcohol can include a selenol group. In certain embodiments, the shell can include MS or MSe.

In certain embodiments, the reaction mixture can be aqueous.

In certain embodiments, the method can include maintaining the reaction mixture at the first temperature for a period of between 5 minutes and 2 hours.

In certain embodiments, the inert atmosphere can include argon or nitrogen.

In certain embodiments, the method can include maintaining the reaction mixture at the second temperature for a period of less than 120 minutes.

A method of preparing a core-shell nanocrystal can include forming a reaction mixture containing a first group II ($M_1$) precursor, a second group II or ($M_2$), a first group VI precursor ($X_1$), and an acid or alcohol including a second group VI material ($X_2$); maintaining the reaction mixture at a first temperature to grow the $M_1X_1$ core of the nanocrystal; raising the temperature of the reaction mixture to a second temperature; and maintaining the reaction mixture at the second temperature to grow a $M_2X_2$ shell of the nanocrystal.

In certain embodiments, $M_1$ can include zinc, cadmium, or mercury. In certain embodiments, $M_2$ can include zinc, cadmium, or mercury.

In certain embodiments, the first temperature can be between 40° C. and 140° C.

In certain embodiments, $X_1$ can include sulfur, selenium, or tellurium. In certain embodiments, $X_2$ can include sulfur, selenium, or tellurium.

In certain embodiments, the acid or alcohol can include a thiol group. In certain embodiments, the acid or alcohol can include a selenol group.

In certain embodiments, the acid can include a thioglycolic acid. In certain embodiments, the acid can include a mercaptopropionic acid.

In certain embodiments, the nanocrystal can be polyhedral.

In certain embodiments, the reaction mixture can be aqueous.

In certain embodiments, the method can include maintaining the reaction mixture at the first temperature for a period of between 5 minutes and 2 hours.

In certain embodiments, the inert atmosphere can include argon or nitrogen.

In certain embodiments, the method can include maintaining the reaction mixture at the second temperature for a period of less than 120 minutes.

Other aspects, embodiments, and features will be apparent from the following description, the drawings, and the claims.

DETAILED DESCRIPTION

Figure 1:
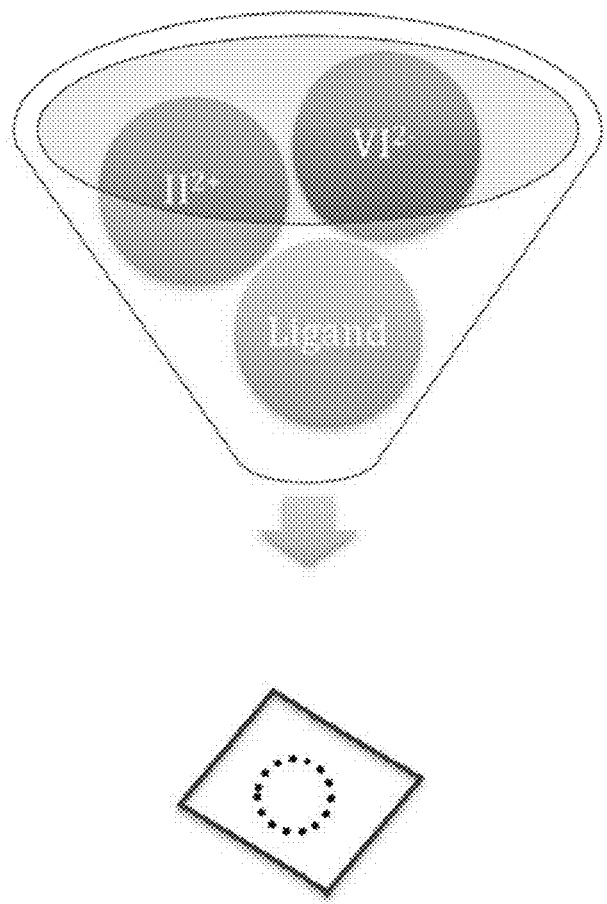
FIG. 1 is a flowchart illustrating a one-pot process of manufacturing semiconductor nanocrystals.

Core-shell semiconductor nanocrystals, also referred to as nanocrystals, having a polyhedron shape can be synthesized in a one-pot process. Semiconductor nanocrystals prepared using this method can have an improved photoluminescence quantum yield, and can be used in biomedical and photonic applications, such as the fluorescent labels for cells and tissues, the high quality phosphors for lightning and displays. The semiconductor nanocrystals can have a well-crystallized polyhedron shape.

A method of manufacturing semiconductor nanocrystals through the metal organic chemical vapor deposition (MOCVD) process needs high cost vacuum tools. In the meantime, scalable production of large quantities of semiconductor nanocrystals with such method is difficult. Consequently, a colloidal chemical process in solvent for synthesizing semiconductor nanocrystals has been developed. A colloidal chemical process can be used in synthesizing cadmium sulfide, cadmium selenide, and telluride semiconductor nanocrystals with a uniform size using and trioctylphosphine as ligands, dimethyicadmium and sulfur, selenium, tellurium as precursors of Group II and Group VI in a high boiling point solvent called trioctylphosphine oxide. Also, a method of synthesizing cadmium selendie semiconductor nanocrystals can be a safer manner using hexadecylamine, and trioctylphosphine as ligands, cadmium oxide, and trioctylphosphine-selenium as precursors of Group II and Group VI in trioctylphosphine oxide solvent.

Core-shell semiconductor nanocrystals can be prepared by over-coating the surfaces of semiconductor nanocrystals with compound semiconductor with a larger bandgap in order to improve fluorescent characteristics and optical and environmental stability of the semiconductor nanocrystals. Since the core-shell semiconductor nanocrystals described above have high fluorescent efficiencies and sufficient optical and environmental stability, they have the great potential to be applied to practical applications such as various fluorescent materials and biological marker materials.

However, the manufacture of conventional core-shell semiconductor nanocrystals involves complicated synthetic processes. Specifically, after synthesis of cores and each intermediate shells of semiconductor nanocrystals, the synthetic process have to be interrupted, all ligands and precursors should be cleaned away, and a precursor required for intermediate shells should be injected into a new surfactant at an appropriate temperature to react over a long period. Also, during the sequential purification steps, some semiconductor nanocrystals and non-reacted precursors are removed too, which is very arduous. Consequently, large-scale synthesis of core-shell semiconductor nanocrystals has been trapped at this bottleneck.

High quality core-shell semiconductor nanocrystals having high photoluminescence quantum yield can be prepared in a one-pot technique in large quantities at low cost.

To overcome the disadvantages of conventional core-shell semiconductor nanocrystals and methods of manufacturing them, a method of economically manufacturing semiconductor nanocrystals having a polyhedron shape through a one-pot colloidal chemistry synthesis process can be used. This method uses the reactivity difference between Group II metal-containing compounds and that between Group VI element-containing compounds. Optically stable semiconductor nanocrystals of highly photoluminescence quantum yield can be manufactured by this method.

One method for preparing a core-shell nanocrystal can include mixing an M-containing precursor solution, an X-containing precursor solution, and an acid or alcohol in an inert atmosphere at a first temperature to form a reaction mixture; maintaining the reaction mixture at the first temperature to grow the MX core of the nanocrystal; raising the temperature of the reaction mixture to a second temperature; and maintaining the reaction mixture at the second temperature to grow a shell of the nanocrystal.

Another method of preparing a core-shell nanocrystal can include forming a reaction mixture containing a first group II ($M_1$) precursor, a second group II precursor ($M_2$), a first group VI precursor ($X_1$), and an acid or alcohol including a group VI material ($X_2$); maintaining the reaction mixture at a first temperature to grow the $M_1X_1$ core of the nanocrystal; raising the temperature of the reaction mixture to a second temperature; and maintaining the reaction mixture at the second temperature to grow a $M_2X_2$ shell of the nanocrystal.

The acid or alcohol can include a group VI element. The acid or alcohol can decompose and the group VI element can be used to grow a shell of the nanocrystal. The acid or alcohol can include a group VI material; the acid can be a carboxylic acid including a group VI material. The acid or alcohol can be a $HX-(CH_2)_n-COOH$, $HX-(CH_2)_n-OH$, HX-PEG-COOH, HX-PEG-OH, their corresponding salt of the acid or alcohol, for example, their potassium salt, sodium salt, etc. PEG is a short chain polyethylene glycol, for example, $-(C_2H_4O)_x-$, where x is 2-20. X is a group VI element, such as sulfur, selenium, or tellurium. n is an integer, preferably having a value of 1, 2, 3, 4, 5, 6, 7, 8, 9, or 10.

M, $M_1$, or $M_2$ can include zinc, cadmium, or mercury. X, $X_1$, or $X_2$ can include sulfur, selenium, or tellurium. The first temperature can be between 20° C. and 150° C. In certain embodiments, $M_1$ and $M_2$ can be the same. In other embodiments, $M_1$ and $M_2$ can be different. In certain embodiments, $X_1$ and $X_2$ can be the same. In other embodiments, X1 and X2 can be different.

The first temperature can be between 20° C. and 150° C. The second temperature can be between 30° C. and 240° C. The acid or alcohol can decompose at the second temperature and release the X material for the shell. The preferred range of the first temperature is between 40° C. and 140° C., the preferred range of the second temperature is between 40° C. and 230° C. and the preferred time is between 5 minutes and 120 minutes.

The method of manufacturing core-shell semiconductor nanocrystals can include the steps of: (1) mixing a first Group II metal-containing compound with a second Group II metal-containing compound; (2) mixing the mixture with a first Group VI element-containing compound and a second Group VI element-containing compound; (3) maintain the mixture at a temperature of 25 to 150° C. for 5 to 120 minutes; and (4) forming the core-shell semiconductor nanocrystals with polyhedron shape by maintaining the mixture of step (3). For the core-shell semiconductor nanocrystals prepared, the core can include the first group II metal and the first group VI material, and the shell can include the second group II metal and the second group VI material.

In another aspect, a method of manufacturing semiconductor nanocrystals can include the steps of: (a) reacting compounds to form cores; and (b) reacting remaining compounds to form shells to form the core-shell structure having a polyhedron shape, wherein step (a) and step (b) are sequentially performed due to a difference in reactivity between the compounds.

Semiconductor nanocrystals can be manufactured with a one-pot method in a short amount of time at low cost using a difference in reactivity between semiconductor precursors, unlike in uneconomical and inefficient conventional methods where shells are formed after forming cores through performing consecutive cleaning and re-dispersion processes. High photoluminescence quanta yield of 70% or higher could be obtained using the one-pot method. Moreover, the use of the ligand can be minimized to facilitate a subsequent cleaning process, and the surfaces of synthesized semiconductor nanocrystals can be easily substituted, so that the semiconductor nanocrystals can be applied in different environments.

The facile one-pot synthesis can be used to prepare a series of highly fluorescent (quantum yield>70%) core-shell semiconductor nanocrystals with polyhedron shape. The core-shell QDs can be obtained by a facile one-pot aqueous protocol at step-wise control the reaction temperature (first aging at low temperature for the growth of the core QDs, and then rise to temperature for the growth of shell materials). During the growth of shell, the semiconductor nanocrystals can change from Type I to Type II, which is revealed by their enormous photoluminescence emission peak shift that cover the green and red range. For type-I core/shell quantum dots, a narrow band gap core is coated with a large band gap shell. In these nanocrystals, the band gap of the core falls within the band gap of the shell so that the exciton charge carriers are primarily confined to the core. For type-II core/shell quantum dots, the band structures of the core and the shell are different, with the valence and conduction bands of the core offset (either higher or lower) from the band gap of the shell. This leads to spatial confinement of the excited electron and hole in the shell or the core separately and results in an indirect recombination of the excitons across the core-shell boundary. The obtained semiconductor nanocrystals can be easily perturbation into the nuclear of cells, such as the B Cell. By simultaneously solving synthetic complexity, semiconductor nanocrystals prepared using one-pot method can represent an important step towards the synthesis and application of new colloidal semiconductor nanocrystals in fluorescent bio-labels for imaging cells and tissues and phosphors for lightning.

A facile one-pot method of manufacturing core-shell semiconductor nanocrystals can have a polyhedron shape. The core shell semiconductor nanocrystal can include a core with a compound comprising of Group II metal and Group VI element, and a shell with a compound comprising of Group II metal and Group VI element. The method can include forming a core-shell semiconductor nanocrystal having a polyhedron shape by step-wise maintaining the reaction mixture at an assigned temperature below 150° C. for assigned reaction time less than 2 hours. In one embodiment, at least one of Group II metal comprises at least one of zinc, cadmium, and mercury. In one embodiment, at least one of the Group VI element comprises at least one of sulfur, selenium, and tellurium.

In the one-pot method, maintaining the mixture can occur in at least one of a $N_2$ atmosphere and an Ar atmosphere; at or below atmospheric pressure; at a low temperature between approximately 25° C. and 150° C.; and for a short duration between approximately 5 minutes and 120 minutes.

The obtained core-shell semiconductor nanocrystals with high photoluminescence quatum yield have a polyhedron shape are used in biomedical and photonic field, such as fluorescent biomarkers for cells and tissues, phosphors for lightning, such as light-emitting diodes (LEDs) and displays.

EXAMPLE

Example 1

One-pot synthesis of core-shell QDs with first exciton absorption peak at 470 nm. The details are as following: Firstly, a $VI^{2-}$ solution was prepared by dissolving tellurium powder (1 mmol) with sodium borohydride (4 mmol) in 2 mL of degassed double distilled water in a thick walled glass tube. A needle was inserted into the capped tube to release the pressure, and the solution was stirred for a few hours in ice water. The $II^{2+}$ precursor solution was prepared by dissolving thioglycolic acid (TGA) (0.625 mmol) and cadmium salts (0.25 mmol) in 50 mL of DI water. The pH was adjusted to 11.5 by adding 1 M NaOH. The $VI^{2-}$ solution (250 μL) was injected into nitrogen saturated $II^{2+}$ solution, with a molar ratio of 2:1:5 for $II^{2+}:VI^{2-}:TGA$. After injection, the color of the solution immediately changed from colorless to yellow. The reaction mixture was aged at 25° C. for 30 minutes. Then, the reaction mixture was heated at 90° C. for 5 minutes, after which the reaction was quenched using an ice-bath.

Example 2

One-pot synthesis of core-shell QDs with first exciton absorption peak at 500 nm. The details are as following: Firstly, a $VI^{2-}$ solution was prepared by dissolving tellurium powder (1 mmol) with sodium borohydride (4 mmol) in 2 mL of degassed double distilled water in a thick walled glass tube. A needle was inserted into the capped tube to release the pressure, and the solution was stirred for a few hours in ice water. The $II^{2+}$ precursor solution was prepared by dissolving thioglycolic acid (TGA) (0.625 mmol) and cadmium salts (0.25 mmol) in 50 mL of DI water. The pH was adjusted to 12.0 by adding 1 M NaOH. The $VI^{2-}$ solution (125 μL) was injected into nitrogen saturated $II^{2+}$ solution, with a molar ratio of 4:1:10 for $II^{2+}:VI^{2-}:TGA$. After injection, the color of the solution immediately changed from colorless to yellow. The reaction mixture was aged at 30° C. for 30 minutes. Then, the reaction mixture was heated at 95° C. for 30 minutes, after which the reaction was quenched using an ice-bath.

Example 3

One-pot synthesis of core-shell QDs with first exciton absorption peak at 470 nm. The details are as following: Firstly, a $VI^{2-}$ solution was prepared by dissolving tellurium powder (1 mmol) with sodium borohydride (4 mmol) in 2 mL of degassed double distilled water in a thick walled glass tube. A needle was inserted into the capped tube to release the pressure, and the solution was stirred for a few hours in ice water. The $II^{2+}$ precursor solution was prepared by dissolving mercaptopropionic acid (MPA) (0.625 mmol) and cadmium salts (0.25 mmol) in 50 mL of nano-pure water. The pH was adjusted to 12.5 by adding 1 M NaOH. The $VI^{2-}$ solution (25 μL) was injected into nitrogen saturated $II^{2+}$ solution, with a molar ratio of 20:1:50 for $II^{2+}:VI^{2-}:MPA$. After injection, the color of the solution immediately changed from colorless to yellow. The reaction mixture was aged at 35° C. for 30 minutes. Then, the reaction mixture was heated at 100° C. for 30 minutes, after which the reaction was quenched using an ice-bath.

Figure 2:
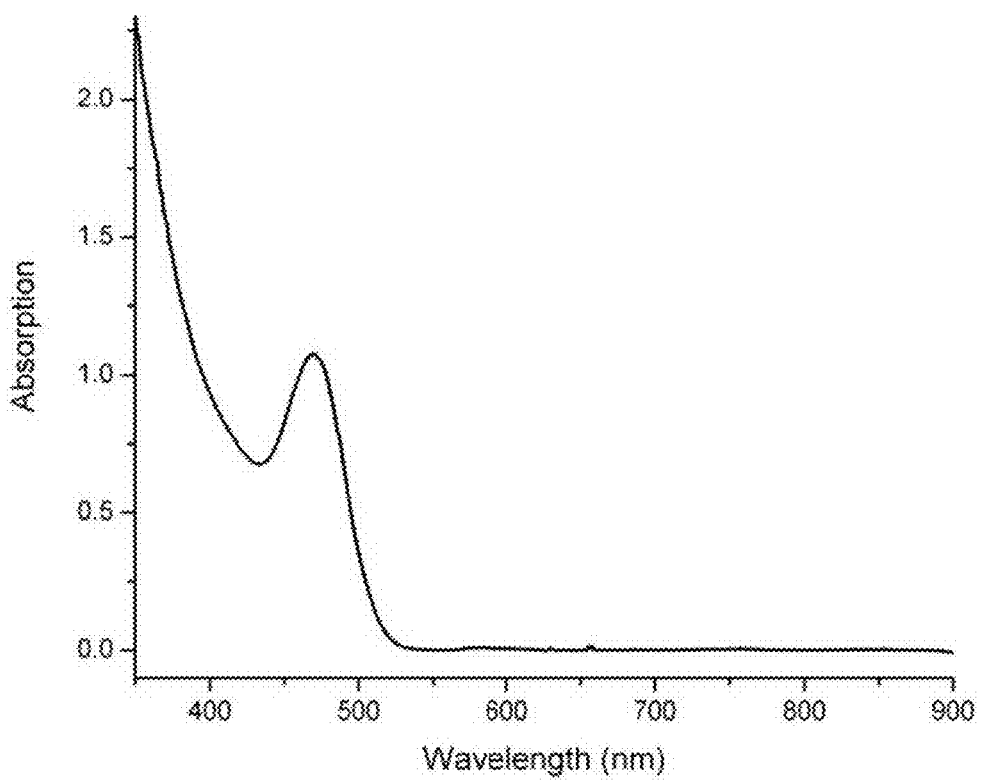
FIG. 2 is a graph showing the UV-VIS absorption spectrum of a semiconductor nanocrystal.
Figure 3:
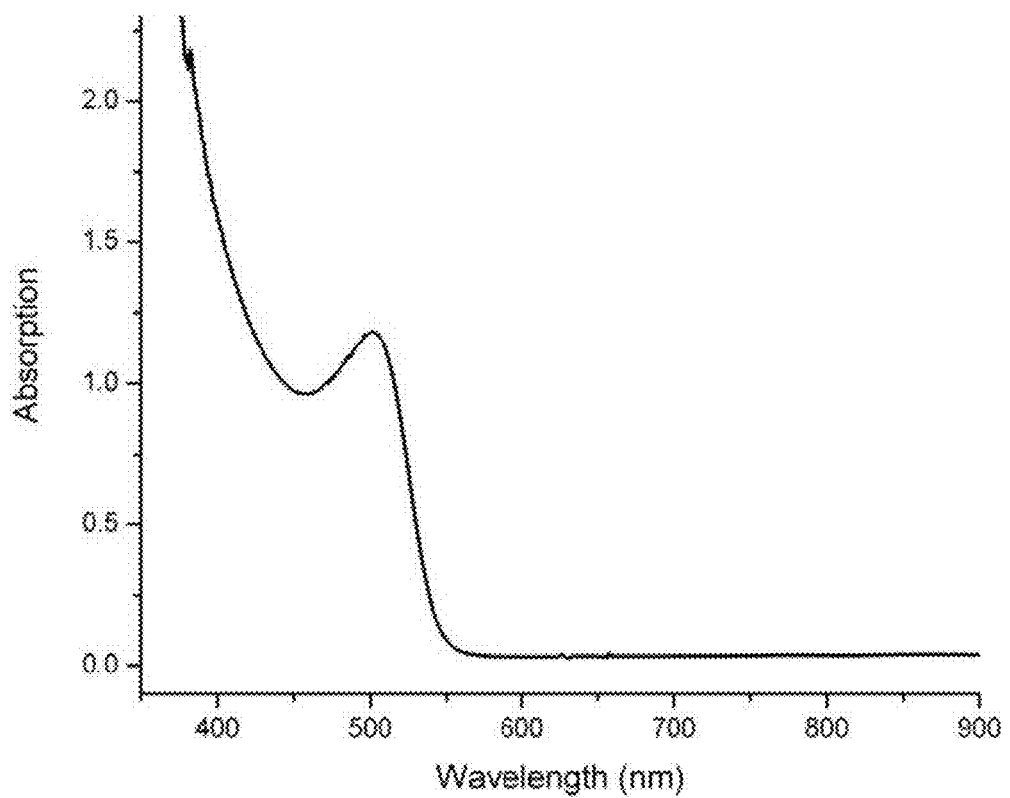
FIG. 3 is a graph showing the UV-VIS absorption spectrum of a semiconductor nanocrystal.

FIG. 1 is a flowchart illustrating a one-pot process of manufacturing semiconductor nanocrystals prepared using the one-pot method. FIG. 2 is a graph showing the UV-VIS absorption spectrum of a semiconductor nanocrystal with first exciton absorption peak at 470 nm prepared using the one-pot method. FIG. 3 is a graph showing the UV-VIS absorption spectrum of a semiconductor nanocrystal with first exciton absorption peak at 500 nm prepared using the one-pot method.

Figure 4:
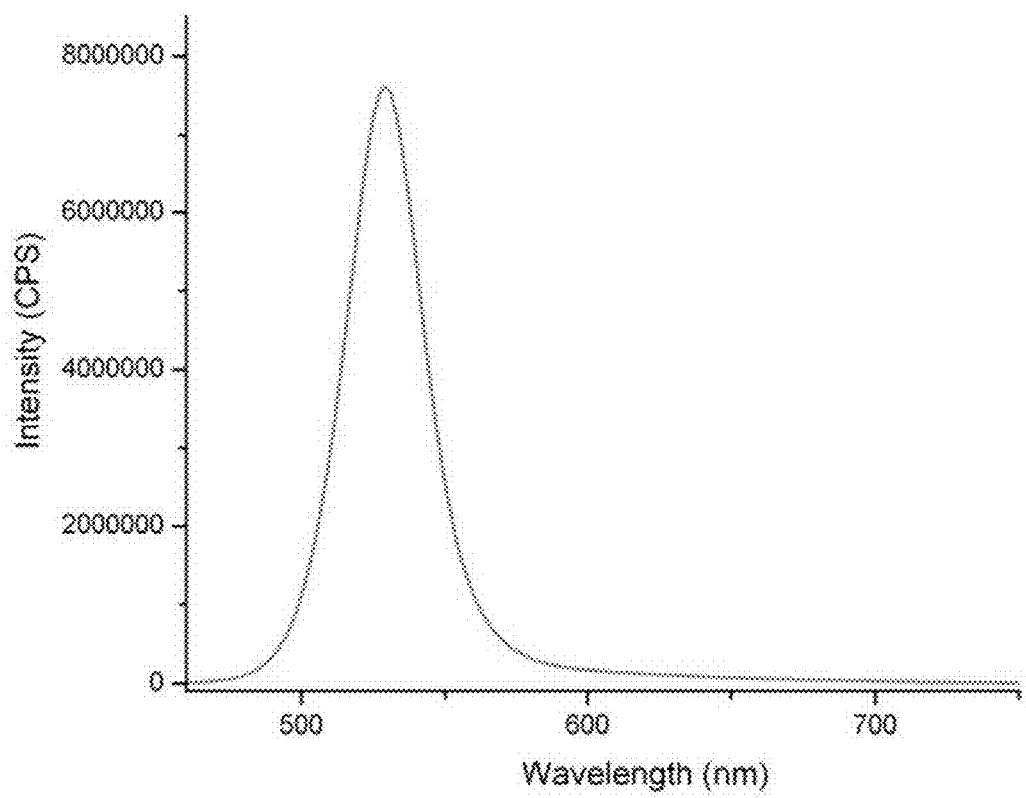
FIG. 4 is a graph showing the photoluminescence spectrum of a semiconductor nanocrystal.
Figure 5:
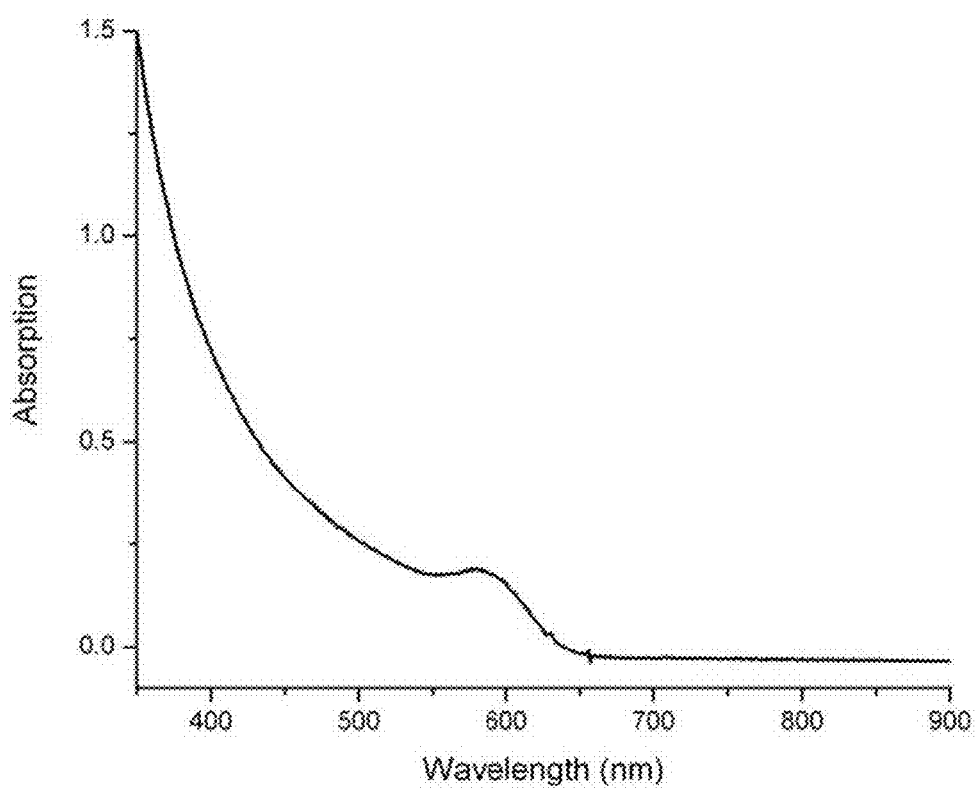
FIG. 5 is a graph showing the UV-VIS absorption spectrum of a semiconductor nanocrystal.
Figure 6:
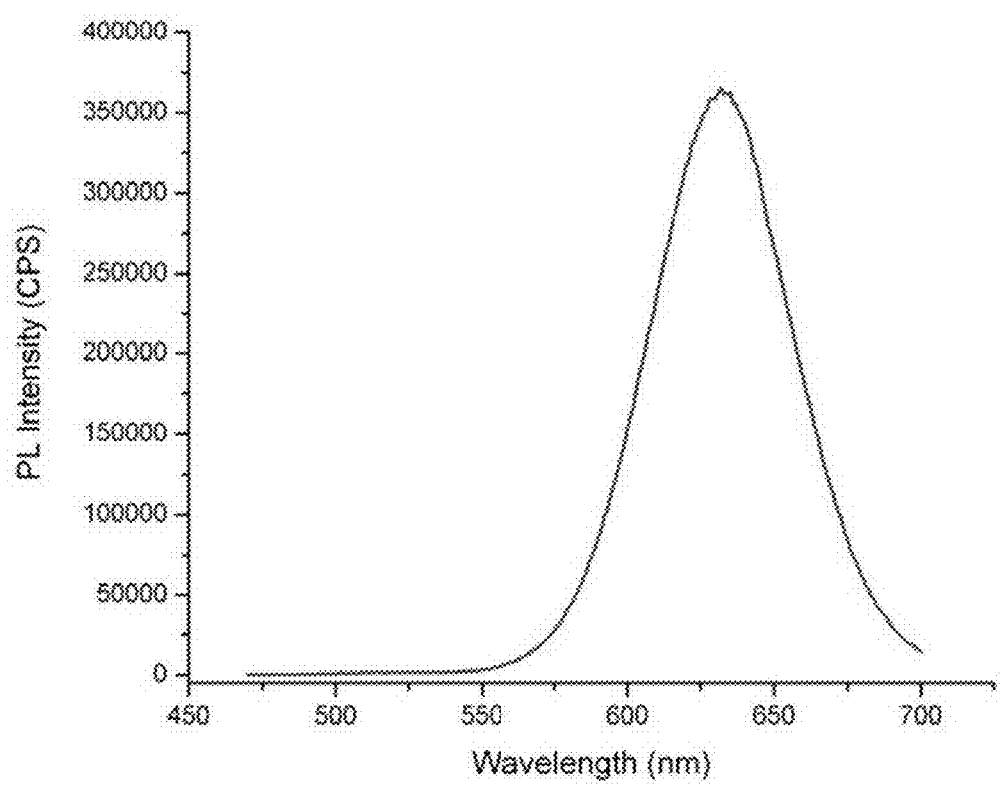
FIG. 6 is a graph showing the photoluminescence spectrum of a semiconductor nanocrystal.

FIG. 4 is a graph showing the photoluminescence spectrum of a semiconductor nanocrystal with first exciton absorption peak at 500 nm prepared using the one-pot method. FIG. 5 is a graph showing the UV-VIS absorption spectrum of a semiconductor nanocrystal with first exciton absorption peak at 595 nm prepared using the one-pot method. FIG. 6 is a graph showing the photoluminescence spectrum of a semiconductor nanocrystal with first exciton absorption peak at 595 nm prepared using the one-pot method.

Figure 7:
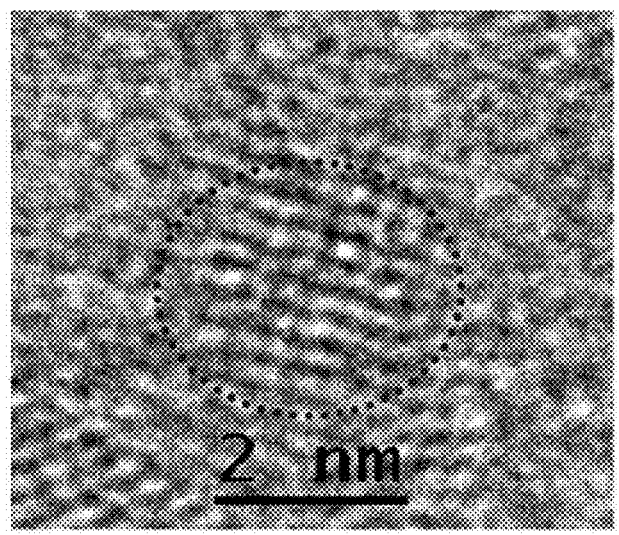
FIG. 7 is a transmission election microscope (TEM) photograph showing semiconductor nanocrystals.
Figure 8:
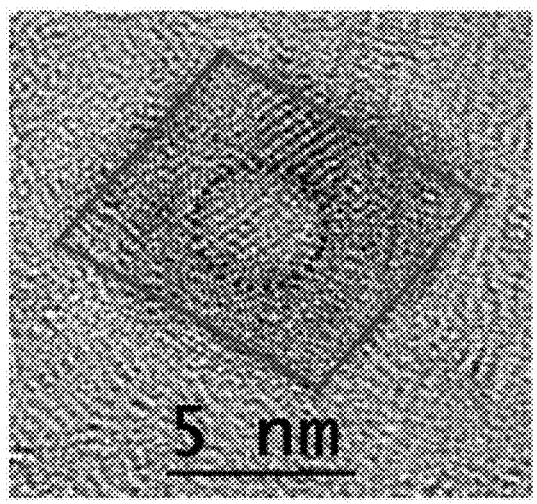
FIG. 8 is a transmission election microscope photograph showing semiconductor nanocrystals.
Figure 9:
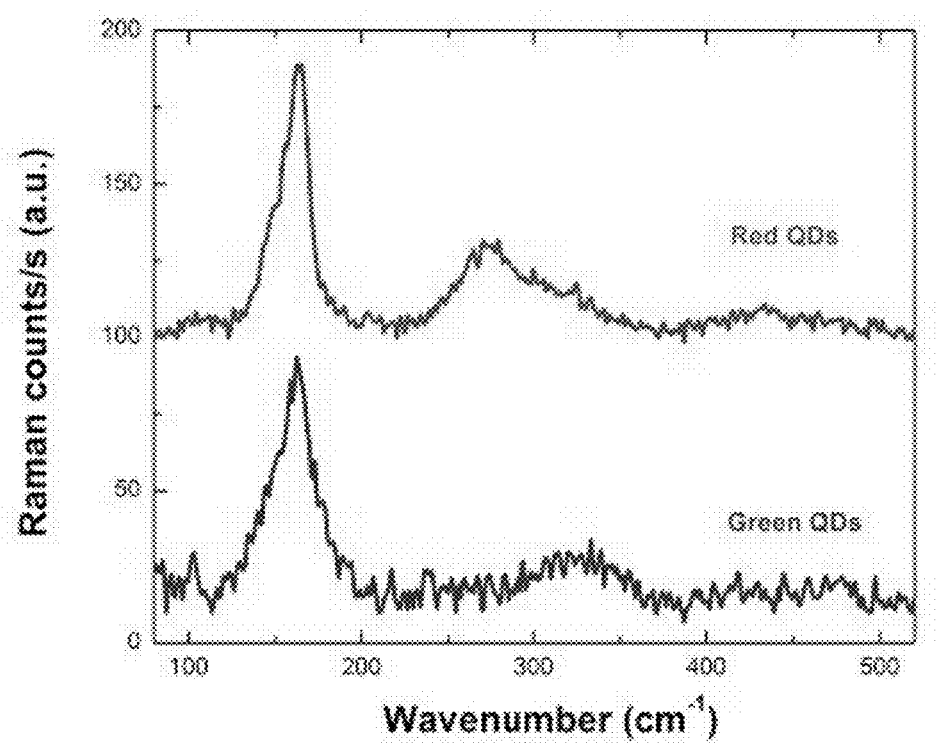
FIG. 9 is a graph showing the Raman spectra of a semiconductor nanocrystal.

FIG. 7 is a transmission election microscope (TEM) photograph showing semiconductor nanocrystals with first exciton absorption peak at 470 nm prepared using the one-pot method. FIG. 8 is a transmission election microscope photograph showing semiconductor nanocrystals with first exciton absorption peak at 595 nm prepared using the one-pot method. FIG. 9 is a graph showing the Raman spectra of a semiconductor nanocrystal with first exciton absorption peaks at 500 and 595 nm prepared using the one-pot method.

Figure 10:
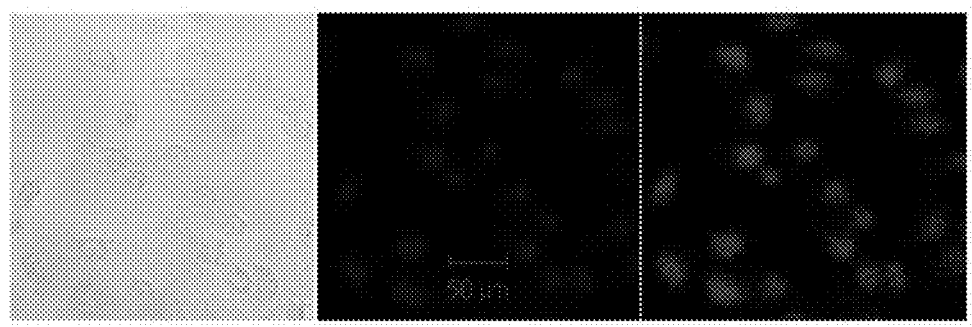
FIG. 10 is a graph showing CPC cell nucleus penetration by semiconductor nanocrystals.

FIG. 10 is a graph showing CPC cell nucleus penetration by semiconductor nanocrystals with first exciton absorption peak at 595 nm. CPC cells were incubated with the QDs, stained with DAPI, and visualized by laser scanning confocol microscopy: (Left) white light image; (Middle) fluorescent image with excitation wavelength at 405 nm and filtered with 420-490 nm band pass filter; (Right) fluorescent image with excitation wavelength at 532 nm, and filtered with 560 nm long pass filters. All scale bars are 50 um. NIR NCs can translocate from cytoplasm to nuclei for biosensing applications.

Other embodiments are within the scope of the following claims.

What is claimed is:

1. A method for preparing a core-shell nanocrystal comprising:
    mixing an M-containing precursor solution, an X-containing precursor solution, and an acid or alcohol in an inert atmosphere at a first temperature to form a reaction mixture;
    maintaining the reaction mixture at the first temperature to grow an MX semiconductor crystalline core of the nanocrystal;
    raising the temperature of the reaction mixture to a second temperature; and
    maintaining the reaction mixture at the second temperature to grow a semiconductor crystalline shell of the nanocrystal for a period of between 5 to 120 minutes.

2. The method of claim 1, wherein the M-containing precursor solution includes zinc, cadmium, or mercury.

3. The method of claim 1, wherein the first temperature is between 40° C. and 140° C.

4. The method of claim 1, wherein the X-containing precursor solution includes sulfur, selenium, or tellurium.

5. The method of claim 1, wherein the acid includes a thioglycolic acid.

6. The method of claim 1, wherein the acid or alcohol includes a mercaptopropionic acid or alcohol.

7. The method of claim 1, wherein the nanocrystal is polyhedral.

8. The method of claim 1, wherein the acid or alcohol includes a thiol group.

9. The method of claim 1, wherein the acid or alcohol includes a selenol group.

10. The method of claim 1, wherein the shell includes MS or MSe.

11. The method of claim 1, wherein the reaction mixture is aqueous.

12. The method of claim 1, further comprising maintaining the reaction mixture at the first temperature for a period of between 5 minutes and 2 hours.

13. The method of claim 1, wherein the inert atmosphere includes argon or nitrogen.

14. A method of preparing a core-shell nanocrystal comprising:
    forming a reaction mixture containing a first group II (M1) precursor, a second group II precursor (M2), a first group VI precursor (X1), and an acid or alcohol including a second group VI material (X2);
    maintaining the reaction mixture at a first temperature to grow the M1X1 core of the nanocrystal;
    raising the temperature of the reaction mixture to a second temperature; and
    maintaining the reaction mixture at the second temperature to grow a M2X2 shell of the nanocrystal for a period of between 5 to 120 minutes.

15. The method of claim 14, wherein M1 includes zinc, cadmium, or mercury.

16. The method of claim 14, wherein M2 includes zinc, cadmium, or mercury.

17. The method of claim 14, wherein the first temperature is between 40° C. and 140° C.

18. The method of claim 14, wherein X1 includes sulfur, selenium, or tellurium.

19. The method of claim 14, wherein X2 includes sulfur, selenium, or tellurium.

20. The method of claim 14, wherein the acid or alcohol includes a thiol group.

21. The method of claim 14, wherein the acid or alcohol includes a selenol group.

22. The method of claim 14, wherein the acid includes a thioglycolic acid.

23. The method of claim 14, wherein the acid includes a mercaptopropionic acid.

24. The method of claim 14, wherein the nanocrystal is polyhedral.

25. The method of claim 14, wherein the reaction mixture is aqueous.

26. The method of claim 14, further comprising maintaining the reaction mixture at the first temperature for a period of between 5 minutes and 2 hours.

27. The method of claim 14, wherein the inert atmosphere includes argon or nitrogen.

* * * * *